US005642523A

United States Patent [19]
Sakaue

[11] Patent Number: 5,642,523
[45] Date of Patent: Jun. 24, 1997

[54] MICROPROCESSOR WITH VARIABLE SIZE REGISTER WINDOWING

[75] Inventor: Kenji Sakaue, Yokohama, Japan

[73] Assignee: Kabushiki Kaisha Toshiba, Kawasaki, Japan

[21] Appl. No.: 287,428

[22] Filed: Aug. 9, 1994

Related U.S. Application Data

[63] Continuation of Ser. No. 480,537, Feb. 15, 1990, abandoned.

[30] Foreign Application Priority Data

Feb. 17, 1989 [JP] Japan ............................ 1-37805

[51] Int. Cl.$^6$ .............................. G06F 9/46; G06F 9/30
[52] U.S. Cl. ........................ 395/800; 395/384; 395/569; 395/492
[58] Field of Search ......................... 395/400, 800, 395/425, 375, 384, 569, 492, 495

[56] References Cited

U.S. PATENT DOCUMENTS

| | | | |
|---|---|---|---|
| 4,777,588 | 10/1988 | Case et al. | 395/800 |
| 5,021,947 | 6/1991 | Campbell et al. | 395/700 |
| 5,083,263 | 1/1992 | Joy et al. | 395/425 |

FOREIGN PATENT DOCUMENTS 0241909  10/1987  European Pat. Off. .

OTHER PUBLICATIONS

Borivoje Furht, "A RISC Architecture with Two-size, Overlapping Register Windows" p. 70, left col., line 31—right col., line 31; p. 71, left col., line 13—right col., line 35, *IEEE Micro*, vol. 8, No. 2, Apr. 1988, NY US.

Milt Leonard, "RISC microprocessors: many architectures thrive", p. 56, middle col., line 7–line 33, *Electronic Design*, vol. 36, No. 17, Jul. 1988, Hasbrouck Heights, NJ, pp. 49–58.

M. Katevenis, "Reduced Instruction Set Computer Architectures for VLSI", ACM Doctoral Dissertation Award 1984, The MIT Press, pp. 52–65, pp. 136–145.

Augget 1985 "A C-Oriented Register Set Design" pp. 89–122.

Tanenbaum; *Structured Computer Organization;* pp. 10–12; 1984.

Huguet; 1985 "C-Oriented Register Set Design", pp. 58–88.

SPARC, Garner, Robert, 1988.

Furht, "RISC Architecture with Multiple Overlapping Windows", Sep. 1985.

Furht et al, "The UM-RISC Central Processing Unit" 1987.

Huguet, "C-Oriented Register Set Design" 1985, INSPEC Abstract.

Maejima et al 1986, "A 16-Bit Microprocessor with Multi-Register Bank Architecture".

*Primary Examiner*—Larry D. Donaghue
*Attorney, Agent, or Firm*—Foley & Lardner

[57] ABSTRACT

The number of registers allocated to each register window (module) is stored in the memory means. The registers, constituting each module are determined by the number allocated in the memory means. Namely, in accordance with individual procedures in the program, a working register used on that procedure is determined and the number of registers constituting the working register is determined.

In addition, memorization of the number of registers allocated to each register window in the memory means is automatically carried out on the basis of address information for a working register. Alternatively, memorization of the number of allocation is carried out on the basis of one of the instructions that the CPU can execute.

19 Claims, 4 Drawing Sheets

MICROPROCESSOR WITH VARIABLE SIZE REGISTER WINDOWING

This application is a continuation of application Ser. No. 07/480,537, filed Feb. 15, 1990, now abandoned.

FIELD OF THE INVENTION

This invention relates to a microprocessor, and more particularly to a RISC (Reduced Instruction Computer Set) type microprocessor.

BACKGROUND OF THE INVENTION

As the microprocessor in accordance with SPARC architecture, there are microprocessor systems using a register window structure. In these programs (using a procedure call many times) used in such systems, many windows are used.

Accordingly, in the case where the number of windows on the microprocessor chip is low, overhead by the overflow/underflow trap processing of the window becomes a great problem. In the SPARC architecture, 16 registers having a length of 32 bits are required in order to add one window. However, since the number of windows on the chip is restricted by the area occupied by the hardware, it is impossible to actually increase the number of windows. In this connection, in the SPARC, it is prescribed that the number of windows is six at the minimum and is 32 at the maximum.

Since the microprocessor of the background art is constructed as described above, the number of registers allotted or allocated to one window is fixed (hereinafter this will be called a fixing system). However, there are many instances where the number of registers actually used in the individual procedure calls is less than the number of allocation. The fact that the number of allocation is fixed is very redundant. For this reason, there cannot be employed, e.g., such a method for effectively utilizing the register to allot a register which is not used in a current window to another window with a present window thus to increase the number of windows.

As a technique to solve such a problem, a variable system, such that the number of registers allotted to one window is variable, is known.

SUMMARY OF THE INVENTION

This invention relates to a technology for constructing a microprocessor including a register window of the variable system. One of the objects is as follows. There is provided a technology for constructing a register window of the variable system to automatically determine the number of registers allotted to one window in dependency upon the content of the execution program of the processor. Thus, there is provided a technology for constructing a processor by a register window of the variable system capable of executing, as it is, a program developed for a microprocessor by a register window of the fixed system. As a result, the processing speed of the program of the background art is improved by reducing the overhead of overflow/underflow of the window without changing the content of the above-mentioned program.

Another object is as follows. There is provided a technology to construct a microprocessor provided with an instruction for controlling the number of registers allocated to the window in an instruction set as a microprocessor using a register window of the variable system. Thus, the number of registers allotted to the window can be flexibly determined in dependency upon the scale of the number of registers using a procedure in the program. As a result, the microprocessor manufactured is convenient for use, the efficiency of using the windows is improved, overhead by overflow/underflow of the window is reduced, and the cost performance is excellent.

In this invention, the number of registers allocated to respective register windows (modules) is stored in the memory means. In dependency upon the number of allocation, which registers, i.e., how many registers constitute each module is determined. Accordingly, the number of registers constituting each module varies in dependency upon the number of allocation in the memory means. Namely, in accordance with individual procedures on the program, a working register used on that procedure is determined and the number of registers constituting the working register is determined.

Furthermore, in this invention, memorization of the number of registers allocated to each register window is automatically carried out on the basis of the address information for the working register. Alternatively, the memorization of the number of allocation is carried out on the basis of one of the instructions that the CPU (the system itself) can execute.

In accordance with this invention, in a system including a plurality of working registers, the number of registers allocated to the window (module) can be changed. For this reason, redundancy of the system is eliminated, thus making it possible to effectively utilize the hardware resources without loss. Furthermore, an excellent cost performance microprocessor based on the register window system can be provided.

Moreover, in accordance with this invention, memorization of the number of registers allocated to registers of the register window is automatically carried out on the basis of the address information for the working register. For this reason, the existing program of the fixed system can be executed as it is, and overhead by overflow/underflow of the window can be reduced.

In addition, in accordance with this invention, memorization of the number of allocation is carried out on the basis of one of instructions that the CPU (the system itself) can execute. For this reason, change in the number of allocation, etc. can be realized by software in dependency upon the scale of the registers used by the procedure in the program. This invention can therefore provide a microprocessor which has a higher efficiency in use of the registers, is more convenient, and has a higher cost performance than processors based on fixed system prior art systems.

DESCRIPTION OF THE PREFERRED EMBODIMENTS

Figure 1:
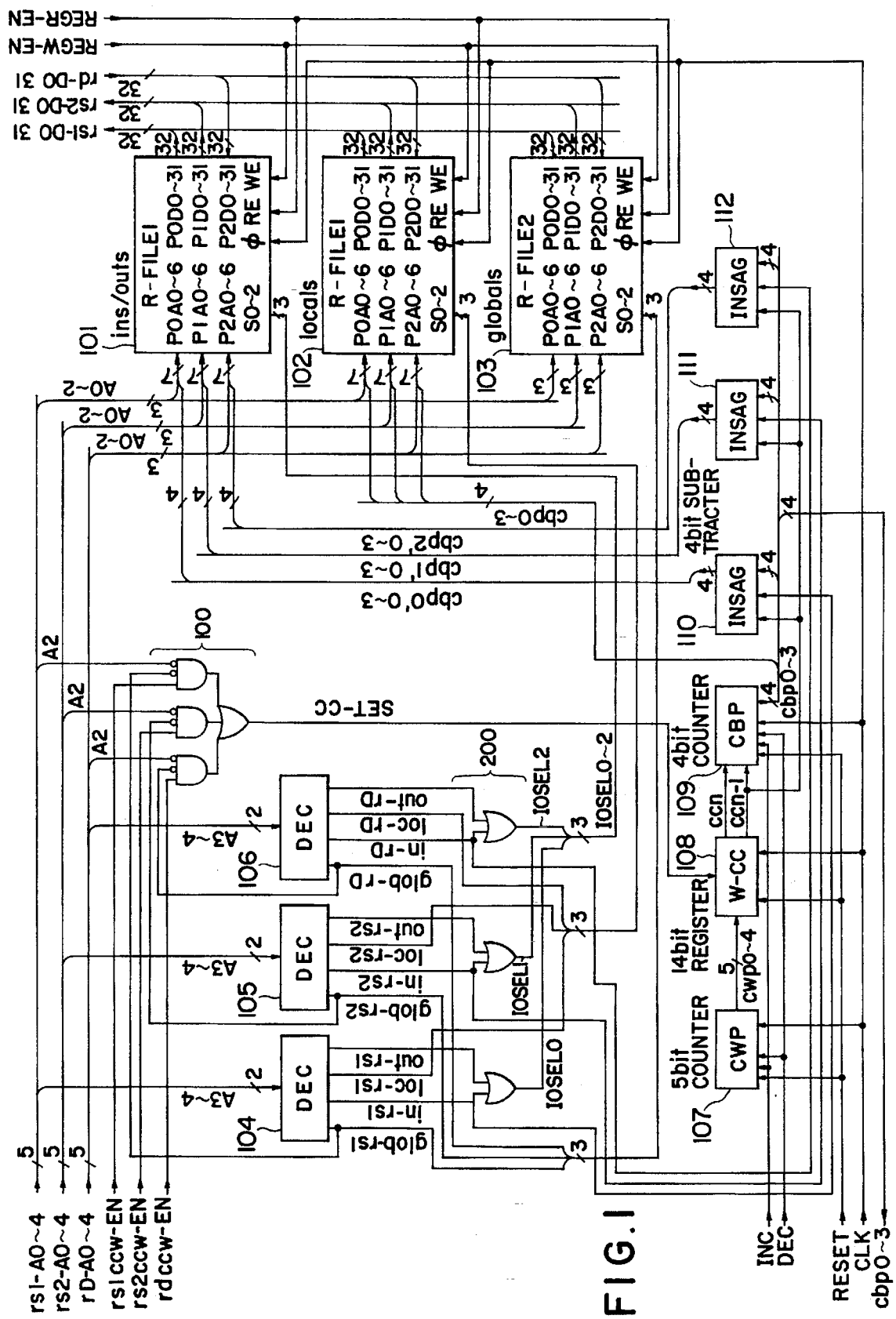
FIG. 1 is a block diagram of a microprocessor according to an embodiment of this invention.

FIG. 1 is a block diagram showing a microprocessor according to an embodiment of this invention. Specifically, there is shown the embodiment where the number of registers allocated to the locals and the outs of the window can be changed to eight or four.

In FIG. 1, register addresses rs1-A0 to 4, register addresses rs2-A0 to 4, and register addresses rd-A0 to 4 designate a source register 1, a source register 2, and a destination register, respectively. Addresses A0 to 2 of the respective addresses are delivered to a R-FILE 1 module (first register) 101, a R-FILE 1 module (second register), and a R-FILE 2 module 103, respectively. These registers are comprised of multiport RAMs that are different from each other, respectively. More particularly, addresses rs1-A0 to 2, addresses rs2-A0 to 2, and addresses rd-A0 to 4 are delivered to ports P0-A0 to 6 of each module, ports P1-A0 to 6, and ports P2-A0 to 6, respectively. Respective addresses A2 are delivered to a logic block 100. Addresses A3 to 4 of the respective addresses are delivered to decoders (DEC) 104, 105 and 106, respectively.

On the other hand, rs1-D0 to 31 denote output data for the source register 1 and rs2-D0 to 31 denote output data for the source register 2. All of these rs1-D0 to 31 and rs2-D0 to 31 are outputted from respective ports P0-D0 to 31, P1-D0 to 31 of R-FILE 1 module 101, R-FILE 1 module 102, and R-FILE 2 module 103. Furthermore, rd-D0 to 31 are input data to the destination register, and these input data are delivered to respective ports P2-D0 to 31 of R-FILE 1 module 101, R-FILE 1 module 102 and R-FILE 2 module 103.

The addresses labeled A0 to 4 designate 32 working registers of 8 globals and 24 registers (8 ins, 8 locals, 8 outs) constituting one window. Data labeled D0 to 31 are input/output data for the working register corresponding to addresses A0 to 4.

The fundamental operation on the program is carried out seemingly in a cycle between two source registers and one destination register. Each of R-FILE 1 module 101, R-FILE 1 module 102 and R-FILE 2 module 103 constituting the working register is of a three-port structure consisting of two data output ports and one data input port. The addresses and data are independently connected to the respective ports of R-FILE 1 module 101, R-FILE 1 module 102 and R-FILE 2 module 103.

The R-FILE 1 module 101 is a module of the register file constituting the working register of ins/outs, and is of a structure of 32 bits×56 registers. The R-FILE 1 module 102 is a module of the register file constituting the working register of locals, and is of a structure of 32 bits×56 registers. Furthermore, the R-FILE 2 module 103 is a module of the register file constituting the working register of globals, and is of a structure of 32 bits×8 registers.

In this connection, in each of R-FILE 1 module 101, R-FILE 1 module 102 and R-FILE 2 module 103, Ø is an input terminal for clock CLK, RE is an input terminal for read enable REGR-EN, WE is an input terminal for write enable REGW-EN, and S0 to 2 are input terminals for signals for selecting respective ports.

Figure 2:
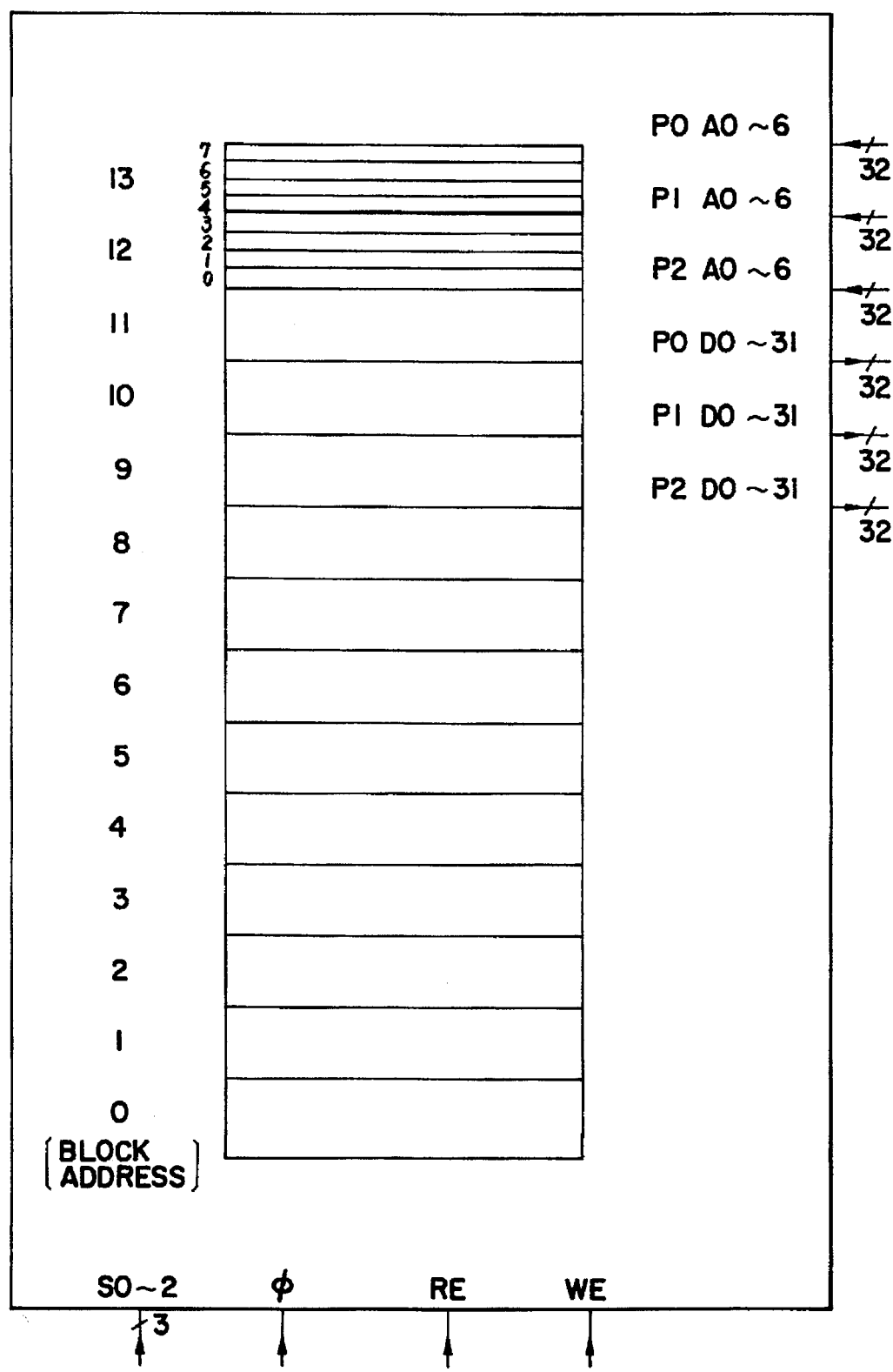
FIG. 2 is an explanatory view showing an embodiment of the detail of R-FILE 1 module 101 shown in FIG. 1.

The internal area of R-FILE 1 module 101 is divided into 14 blocks addressed 0 to 13 as shown in FIG. 2, respectively. Furthermore, one block is composed of four registers. Addresses A3 to 6 of the port P0 (higher order 4 bits) are block addresses, respectively. Addresses A0 to 2 (lower order 3 bits) of the port P0 are addresses for eight registers each essentially comprised of a block designated by addresses A3 to 6 of the port P0. Addresses A0 to 6 of the port P1 and addresses A0 to 6 of the port P2 are the same as the above. With respect to the block allocated to the register file when the window 13 is in an eight register mode, locals are blocks 13, 12 of the R-FILE 1 module 102, outs are blocks 13, 12 of R-FILE 1 module 101, and ins are block 0 (initial state) of R-FILE 1 module 101. Furthermore, with respect to the block allocated to the register file when the window 13 is in a four register mode, locals is block 13 of R-FILE 1 module 102, outs is block 13 of R-FILE 1 module 101, and ins is block 0 (initial state) of R-FILE 1 module 101. In addition, whether or not ports P0 to 2 are in an enable state is determined by an input signal for S0 to 2. In this connection, when an input signal for S0 to 2 represents "1", ports P0 to 2 are enabled.

Furthermore, a current window pointer (CWP) 107 outputs the number of a window used by the current procedure. This pointer is constructed as a binary counter of 5 bits which can perform an incremental operation on the basis of the increment signal INC. In this connection, since the current window pointer (CWP) forms 5 bits of lower order of the processor state register (PSR) in SPARC, the CWP employs a structure of 5 bits in conformity with the above in this embodiment. When a reset signal RESET is inputted to the current window pointer (CWP) 107, the count value thereof is set as the number of the window CWP=13 that the procedure initially uses. In this connection, since windows are used in order from the maximum window number to the minimum one in SPARC, a manner of use based thereon is employed in this embodiment. In this instance, when a decremental operation is performed by the decremental signal DEC under the state of CWP=0, the window number is returned to CWP=13. Output signals CWP0 to 4 of the current window pointer (CWP) 107 designate bits of a register (W-CC) 108 described below.

A register (W-CC) 108 is a register of 14 bits for storing information as to whether each window is in an eight register mode or in a four register mode. These 14 bits correspond to 14 windows, respectively. The bits "0" and "1" correspond to the eight register mode and the four register mode, respectively. When RESET is inputted, all bits are reset to "0". Thus, each window is set so that it is in the four mode. Switching to the eight register mode is automatically carried out as follows. Namely, working registers of outs and locals are divided into four first halves and four latter halves in the order of eight addresses, respectively. When only four outs and locals of the latter half are accessed by the procedure to shift to the next window, that window remains in the four register mode. If any register of the first half is accessed in either outs or locals, a corresponding bit of the register (W-CC) 108 is set to "1". Thus, this window is brought into the eight register mode. The first half of locals corresponds to r16 to r19, the latter half thereof corresponds to r20 to r23, the first half of outs corresponds to r8 to r11, and the latter half thereof corresponds to r12 to r15.

On the other hand, an enable signal rs1CCW-EN enables or permits rs1-A2 of the register address of the source register 1 to be used for setting register (W-CC) 108. Furthermore, an enable signal rs2CCW-EN enables rs2-A2 of the register address of the source register 2 to be used for setting the register (W-CC) 108. In addition, an enable signal rdCCW-EN enables rd-A2 of the register address of the destination register to be used for setting the register (W-CC) 108. These enable signals rs1CCW-EN, rs2CCW-EN, and rdCCW-EN are inputted to the logic block 100 to which respective addresses A2 are inputted. As a result, the logic block 100 outputs a set signal SET-CC for setting a specified bit or bits of the register (W-CC) 108 to "1". In this connection, bit designation is carried out by CWP0 to 4 from the current window pointer (CWP) 107.

The register (W-CC) 108 which has been subjected to bit designation by the set signal SET-CC from the logic block 100 and CWP0 to 4 from the current window pointer (CWP) 107 outputs a bit output ccn and a bit output ccn-1 to a current block pointer (CBP) 109. In this connection, the bit output ccn represents the bit state of the register (W-CC) 108 corresponding to a current window, and the bit output ccn-1 represents the bit state of the register (W-CC) 108 corresponding to a previous window.

The current block pointer (CBP) 109 is a binary counter of 4 bits for designating a block in the R-FILE 1 module 101 actually used by a current window. This pointer 109 is operable to take values of "-1", "-2", "+1", and "+2". When a reset signal RESET is inputted to the current block pointer 109, this pointer 109 allocates the block 13 of the R-FILE 1 module 101 to a window initially used by the procedure. Thus, CWP=13 results. In this connection, when a decremental operation is performed by the decremental signal DEC under the state of CWP=0, CWP is returned to CWP=13. By outputs CWP=CbP0 to 3 from the current block pointer (CBP) 109, the number of registers allocated to the window is controlled. It is to be noted that these outputs CBP=CbP0 to 3 also have a function to inform the external of the overflow/underflow of the window. When CWP changes to CWP-1 to shift to the next window, if the bit output ccn is "1", CBP becomes CBP-2, thus allocating eight registers (two blocks) to the current window. On the other hand, if the bit output ccn is "0", CBP becomes CBP-1, thus allocating four registers (one block) to the current window. In contrast, when CWP changes to CWP+1 to return to the previous window, if the bit output ccn-1 is "1", CBP becomes CBP+2, and if the bit output ccn-1 is "0", CBP becomes CBP+1.

Subtracters (INSAG) 110, 111 and 112 are subtracters of four bits for converting the block designation address for the R-FILE 1 module 101 of ins/outs from the value of outs to the value of ins when the register address designates ins, respectively. These subtracters are provided in correspondence with ports P0, P1, and P2 of the R-FILE 1 module 101, respectively. When ins is designated and the bit output ccn-1 is "1", respective values of output signals CbP0'0 to 3, CbPl'0 to 3, and CbP2'0 to 3 from the subtracters (INSAG) 110,111 and 112 become CBP-2. When the bit output ccn-1 is "0", respective values of output signals CbP0'0 to 3, CbPl'0 to 3, CbP2'0 to 3 from the subtracters (INSAG) become CBP-1. On the other hand, when outs is designated, CBP=0 to 3 are outputted as they are as respective values of outputs CbP0'0 to 3, CbPl'0 to 3, and CbP2'0 to 3 from the subtracters (INSAG) 110, 111, and 112.

Decoders (DEC) 104, 105, and 106 decode each 2 bits of higher order of register addresses rs1-A0 to 4, rs2-A0 to 4, and rd-A0 to 4 to designate globals, ins, or locals, respectively. Furthermore, when A3="0" and A4="0", glob-rs1, glob-rs2, and glob-rd are outputted from the decoder (DEC) 104, the decoder (DEC) 105, and the decoder (DEC) 106, respectively. Furthermore, when A3="1" and A4="0", in-rs1, in-rs2, and in-rd are outputted from the decoder (DEC) 104, the decoder (DEC) 105, and the decoder (DEC) 106, respectively. Furthermore, when A3="0" and A4="1", loc-rs1, loc-rs2, and loc-rd are outputted from the decoder (DEC) 104, the decoder (DEC) 105, and the decoder (DEC) 106, respectively. In addition, when A3="1" and A4="1", out-rs1, out-rs2, and out-rd are outputted from the decoder (DEC) 104, the decoder (DEC) 105, and the decoder (DEC) 106, respectively. Among these signals, in-rs1, in-rs2 and in-rd, and out-rs1, rs2 and rd are processed at a logic block 200. The signals thus processed are outputted as enable signals for respective ports of the R-FILE 1 module 101 of IOSEL 0 to 2, and are inputted to input terminals S0 to 2 of the R-FILE 1 module 101. Furthermore, loc-rs1, loc-rs2, and loc-rd are outputted as enable signals for respective ports of the R-FILE 1 module 102, and are inputted to input terminals S0 to 2 of the R-FILE 1 module 102. In addition, glob-rs1, glob-rs2, and glob-rd are outputted as enable signals for respective ports of the R-FILE 1 module 103, and are inputted to input terminals S0 to 2 of the R-FILE 1 module 103. In this connection, the addresses r0 to 7, r8 to 15, r16 to 23, and r24 to 31 correspond to globals, outs, locals, and ins, respectively.

The operation of the configuration described above will now be described with reference to the time chart shown in FIG. 3. FIG. 3A represents a clock CLK; FIG. 3B a decrement signal DEC; FIG. 3C an increment signal; FIG. 3D a read enable signals REGR-EN delivered to the R-FILE 1 module 101, the R-FILE 1 module 102, and the R-FILE 2 module 103; FIG. 3E a write enable signal REGW-EN delivered to the R-FILE 1 module 101, the R-FILE 1 module 102, and the R-FILE 2 module 103; FIG. 3F enable signals rs1CCW-EN, rs2CCW-EN, and rdCCW-EN for enabling respective register addresses to be set at the register (W-CC) 108; FIG. 3G register addresses rs1-A0 to 4; FIG. 3H register addresses rs2-A0 to 4; FIG. 3I register addresses rd-A0 to 4; FIG. 3J output data rs1-D0 to 31 from the source register 1; FIG. 3K output data rs2-D0 to 31 from the source register 2; FIG. 3L output data rd-D0 to 31 from the destination register; FIG. 3M outputs CWP0 to 4 from the current window pointer (CWP) 107; FIG. 3N a bit output ccn from the register (W-CC) 108; FIG. 3O a bit output ccn-1 from the register (W-CC) 108; FIG. 3P CbP0 to 3 which are outputs from the current block pointer (CBP) 109; FIG. 3Q CbP0'0 to 3 outputted from the subtracter (INSAG) 110; FIG. 3R CbPl'0 to 3 are outputted from the subtracter (INSAG) 111; FIG. 3S CbP2'0 to 3 are outputted from the subtracter (INSAG) 112; FIG. 3T a glob-rs1 outputted from the decoder (DEC) 104; FIG. 3U an in-rs1 outputted from the decoder (DEC) 104; FIG. 3V a loc-rs1 outputted from the decoder (DEC) 104; FIG. 3W an out-rs1 outputted from the decoder (DEC) 104; and FIG. 3X a set signal SET-CC outputted from the logic block 100.

Figure 3:
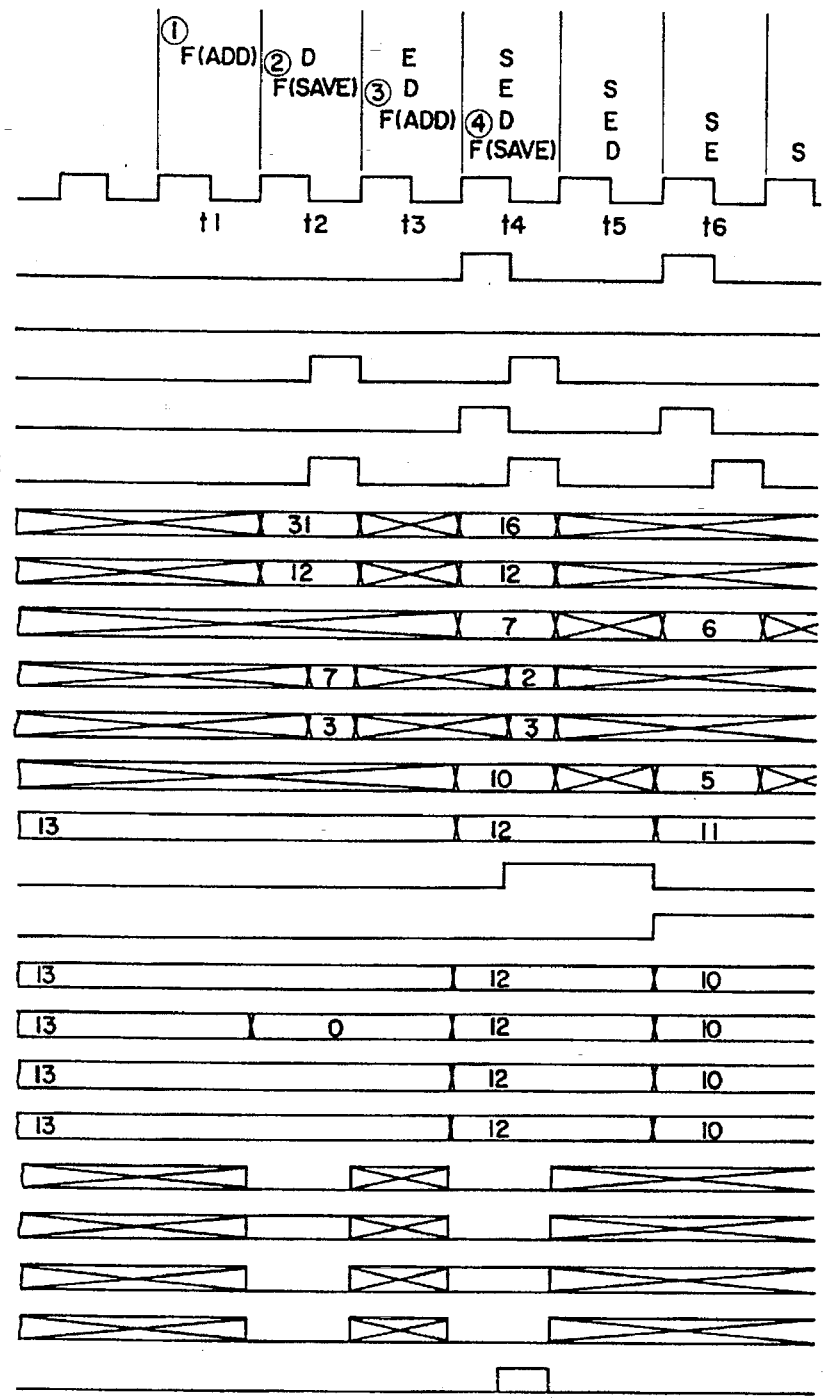
FIG. 3 is a timing chart for explaining the operation of the system shown in FIG. 1.

In the sequence of the instruction shown in FIG. 3, the period ① represents ADD, the period ② represents SAVE, the period ③ represents ADD, and the period ④ represents SAVE. At the period of ①, indicative of ADD, r31 of rs1 and r12 of rs2 are added to r7 of rd, and the added result is shifted. Then, at the period ②, indicative of SAVE, the operation shifts to the next window, thus replacing CWP with CWP-1. At the period of ③, indicative of ADD, r16 of rs1 and r12 of rs2 are added to r6 of rd, and the added result is shifted. Finally, at the period of ④ indicative of SAVE, save operation is performed. In this respect, it is assumed that 7, 3 and 2 are stored in [r31], [r12] and [r16], respectively. In this embodiment, a pipe-line structure of four stages is employed.

Figure 4:
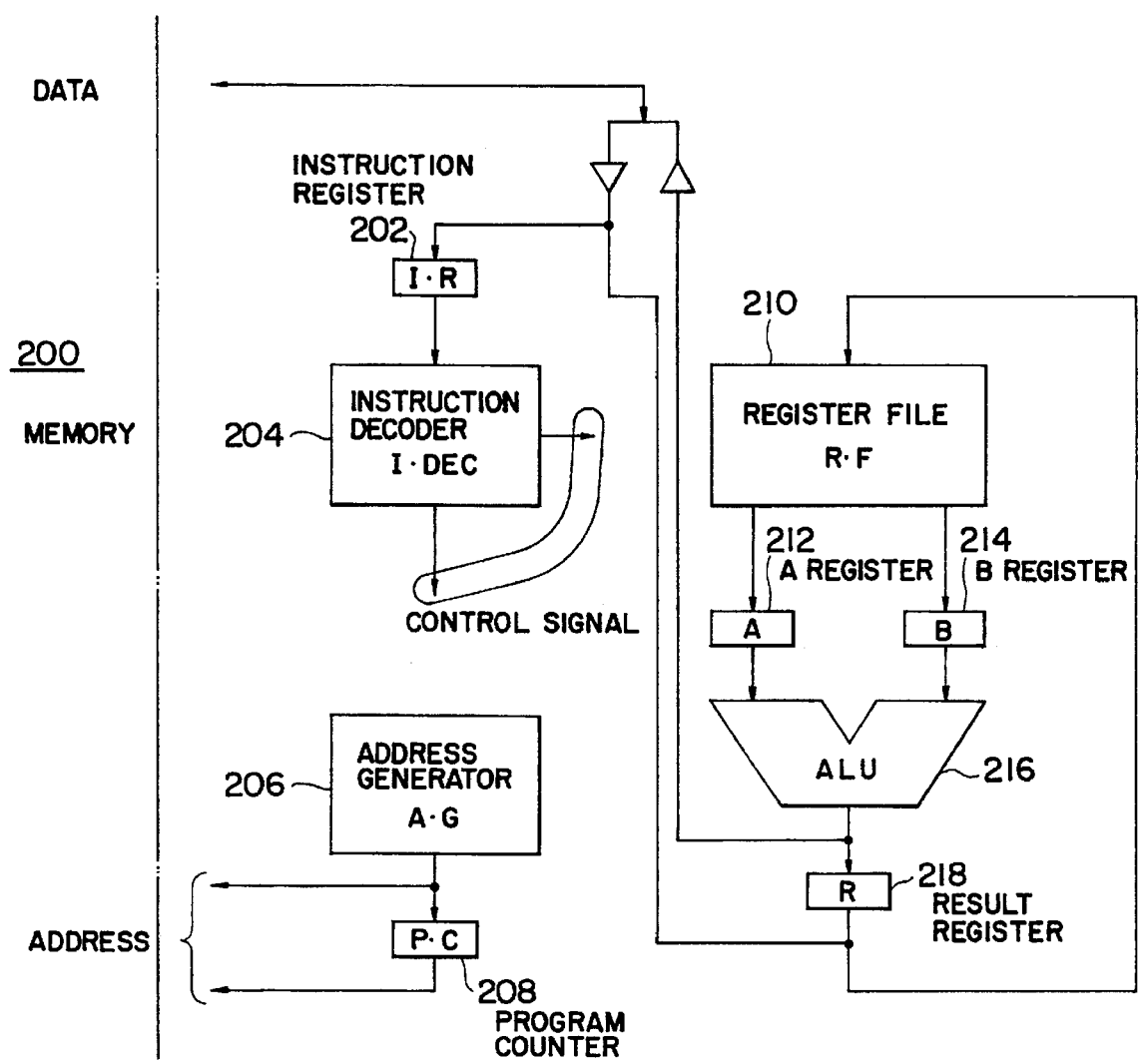
FIG. 4 is an explanatory view showing the outline of a pipe line structure.

The explanation of the outline of the pipe-line structure will now be made with reference to FIG. 4. The processing at respective stages will be described by taking an example of an ADD instruction.

Initially, an ADD instruction is taken out from a memory 200 and is then written into an instruction register (IR) 202 (step F). Then, the instruction in the instruction register (IR) 202 is inputted to an instruction decoder (IDEC) 204 and is then decoded thereat. An address for the next instruction is generated by an address generator (AG) 206 and a program counter (PC) 208. Register addresses rs1 and rs2 (data from two source registers) are read out from a register file (RF) 210, and are then written into an A register 212 and a B register 214, respectively (step D).

Data from the A register 212 and data from the B register 214 are added at an arithmetic and logic unit ALU 216. The added result is written into a result register (R) 218 (step E).

Data from the result register (R) 218 is written into the destination register indicated by rd (step S).

In the timing chart shown in FIG. 3, an indication is made in a manner that respective steps are caused to correspond to t1, t2, t3, and t4 of the clock CLK. Namely, initially, in the case of ADD instruction of ①, at step D of t2, register addresses rs1-A0 to 4 and rs2-A0 to 4 become equal to 31 and 12, respectively. Thus, data of r31 and r12 are read out from the register file. It is to be noted that since the actual read operation is carried out at the latter half of t2, data rs1-D0 to 31 and data rs2-D0 to 31 are outputted at the latter half of t2. In this instance, since the data of r31 represents 3, the data rs1-D0 to 31 and the data rs2-D0 to 31 become equal to 7 and 3, respectively. Then, an operation expressed as r31+r12=10 is executed at the step E of t3. The result thus obtained is written into the register. Since r31 is ins register, CbP0'0 to 3=0 results at CBP-1 at the time of readout of r31. At the next step S of t4, data in the result register is written into the destination register r7. Write operation is performed at the first half of t4. It is to be noted that read operation is being carried out for ADD instruction of ③ at the first half of t4.

In the case of SAVE instruction of ②, at step E of t4, an operation expressed as CWP=CWP−1 is executed. In the execution of ①, there is no access to locals and an access to outs is made as an access to r12 of the latter half in r8 to r15. As a result, the bit 13 of the register (W-CC) 108 remains at "0". Namely, the window 13 remains in the four register mode. Thus, an operation expressed as CBP=CBP−1 is executed.

In the case of ADD instruction of ③, at step D of t4, data 2, 3 of r16 and r12 are outputted as data rs1-D0 to 31 and rs2-D0 to 31. At this time, since r16 is a register of the first half of locals, the set output SET-CC becomes equal to "1". Thus, "1" is set at the bit 12 of the register (W-CC) 108. As a result, the window 12 is brought into the eight register mode.

In the case of SAVE instruction of ④, at step E of t4, an operation expressed as CWP=CWP−1 is executed. Since the window 12 is in the eight register mode, an operation expressed as CBP=CBP−1 is executed.

In the above-described embodiment, management of the number of allocation of locals and outs is conducted for every blocks. The number of registers of locals and that of ins/outs are equal to each other, and locals and ins/outs are separately provided as different modules. As a result, the following benefits result: The condition information per each window is sufficient to be one bit. The actual address generation circuit becomes simplified. In addition, calculation of the actual address can be carried out at a high speed.

It is to be noted that while switching between eight and four registers is illustrated in the above-described embodiment, the number of registers to be allocated may be arbitrarily selected within a range of eight to zero registers. Furthermore, the number of registers allocated to locals and that allocated to outs may be different from each other.

In this connection, if the number of registers for the window is variable, a 14 bit register is required for the register (W-CC) 108, a 4 bit counter is required for current block pointer (CBP) 109, and a functional circuit of 4 bit full adder x3=12 bit full adder is required for subtracters (INSAG) 110, 111, and 112. In contrast, since a circuit required for adding n windows is a register having a length of 32 bits ×16×n, it is seen that the configuration shown in FIG. 1 is far superior excellent in cost performance.

In addition, while switching between eight and four registers is carried out in the above-described embodiment, it is a matter of course that there may be employed a method of allowing the processor itself to have a switching instruction to carry out a switching on the software using that instruction.

In this case, it is sufficient to provide, in the instruction set of the processor, an instruction to rewrite the content the register which performs the function such as W-CC register shown in FIG. 1 into a predetermined value.

What is claimed is:

1. A microprocessor comprising:
   a plurality of registers, including a plurality of first registers, said plurality of registers being divided into a plurality of register windows, said plurality of register windows being selectively allocated to procedures of a program as working registers for the procedures, wherein each of said registers can be selectively allocated to at least two of said plurality of register windows;
   a logic gate which receives register addresses in each instruction executed by the microprocessor and detects, during decode processing of said each instruction, a number of the registers constituting each register window on the basis of said register addresses; and
   a memory device for storing the numbers of the registers constituting each of said register windows for use during execution of a corresponding instruction by said microprocessor.

2. A microprocessor comprising:
   a plurality of registers, including a plurality of first registers, said plurality of registers being divided into a plurality of register windows, said plurality of register windows being selectively allocated to procedures of a program as working registers for the procedures, wherein each of said registers can be selectively allocated to at least two of said plurality of register windows; and
   register allocating means for detecting a number of the registers constituting each register window on the basis of register addresses in each instruction executed by the microprocessor during decode processing of said each instruction, and storing the numbers of the registers constituting each of said register windows for use during execution of a corresponding instruction by said microprocessor.

3. A microprocessor comprising:
   a plurality of register windows including a plurality of first registers, a certain number of said register windows being selectively allocated to a procedure on a program as a working register used for the procedure, each of said first registers being allocable in common to at least two of said plurality of register windows; and
   means for detecting a number of the first registers constituting each register window on the basis of register addresses in each instruction executed by the microprocessor during decode processing of said each instruction, and
   means for storing the numbers of the first registers constituting each of said register windows for use during execution of a corresponding instruction by the microprocessor.

4. A microprocessor as set forth in claim 3, wherein each of said registers constitute a register block of n registers, where n is a positive integer.

5. A microprocessor as set forth in claim 4, wherein said means for determining and storing is constructed to store M register blocks as said numbers of registers constituting each of said register windows, whereby the numbers of registers constituting each of said register windows is determined as n×M, M being a positive integer.

6. A microprocessor as set forth in claim 4, wherein said register blocks are allocable in common to two adjacent register windows to which serial numbers are assigned.

7. A microprocessor as set forth in claim 5, wherein said register blocks comprising said first registers are allocable in common to two adjacent register windows to which serial numbers are assigned.

8. A microprocessor as set forth in claim 4, wherein said first registers comprise first register blocks and each of said register windows further comprises second register blocks allocable only to a single corresponding register window.

9. A microprocessor as set forth in claim 8, wherein the number of first register blocks allocable in common to said register windows to which serial numbers are assigned and the number of register blocks allocated only to one of said register windows are equal.

10. A microprocessor as set forth in claim 8, wherein said first register and said register block are composed of multiport RAMs respectively receiving different addresses.

11. A microprocessor as set forth in claim 3, wherein said first registers are allocable in common to two adjacent register windows to which serial numbers are assigned.

12. A microprocessor as set forth in claim 11, wherein each register window further comprises a second register allocated only to a corresponding register window itself.

13. A microprocessor as set forth in claim 12, wherein the number of registers allocable in common to said two adjacent register windows to which serial numbers are assigned and the number of registers allocable only to one of said register windows are equal to each other.

14. A microprocessor as set forth in claim 12, wherein said first register and said second register are composed of multiport RAMs respectively receiving different addresses.

15. A microprocessor as set forth in claim 3, wherein each said register window further comprises a second register allocable only to a single register window.

16. A microprocessor as set forth in claim 15, wherein the number of registers allocable in common to two adjacent register windows to which serial numbers are assigned and the number of registers allocated only to each of said register windows are equal to each other.

17. A microprocessor as set forth in claim 15, wherein said first register and said second register are composed of multiport RAMs respectively receiving different addresses.

18. A microprocessor as set forth in claim 3, wherein each of said registers constitute unit blocks of n registers, (n is a positive integer), said respective register blocks comprising said first registers being allocable in common to at least two of said plurality of register windows.

19. A microprocessor as set forth in claim 15, wherein said first register and said second register are composed of multiport RAMs respectively receiving different addresses.

* * * * *